United States Patent [19]

Li

[11] Patent Number: 5,454,175
[45] Date of Patent: Oct. 3, 1995

[54] INTERNAL CALIPER

[76] Inventor: Kam K. Li, 3387 Hunter Dr., North Olmsted, Ohio 44070-1264

[21] Appl. No.: 207,277

[22] Filed: Mar. 7, 1994

[51] Int. Cl.$^6$ ............................................. G01B 5/12
[52] U.S. Cl. ........................... 33/797; 33/807; 33/542
[58] Field of Search ............................... 33/797, 798, 799, 33/800, 807, 808, 542

[56] References Cited

U.S. PATENT DOCUMENTS

| | | | |
|---|---|---|---|
| 1,317,708 | 10/1919 | Kaplan . | |
| 1,384,710 | 7/1921 | Morell . | |
| 2,357,689 | 9/1944 | Rondinone | 33/800 |
| 2,573,075 | 10/1951 | Watson | 33/797 |
| 2,785,471 | 3/1957 | Aldeborgh et al. . | |
| 2,787,835 | 4/1957 | Butts | 33/798 |
| 2,791,033 | 5/1957 | Walters | 33/799 |
| 3,507,046 | 4/1970 | Smith et al. . | |
| 3,537,184 | 11/1970 | Hearn | 33/199 R |
| 3,922,792 | 12/1975 | Ito | 33/542 |
| 4,397,092 | 8/1983 | Marcyan | 33/797 |
| 4,610,090 | 9/1986 | Brady | 33/797 |

*Primary Examiner*—Christopher W. Fulton
*Attorney, Agent, or Firm*—D. Peter Hochberg; Mark Kusner; Michael Jaffe

[57] ABSTRACT

A caliper gauge comprised of an elongated body having a pistol-type grip formed at one end and a caliper arm formed at the other end. An elongated slot is formed in the body adjacent the pistol-type grip, and an opening extends through the body communicating with the slot. A lever having a trigger formed at one end and a caliper end formed at the other end extends through the opening in the body and is mounted thereto for pivotal movement relative to the body to provide a caliper gauge having a scissor-like configuration.

17 Claims, 3 Drawing Sheets

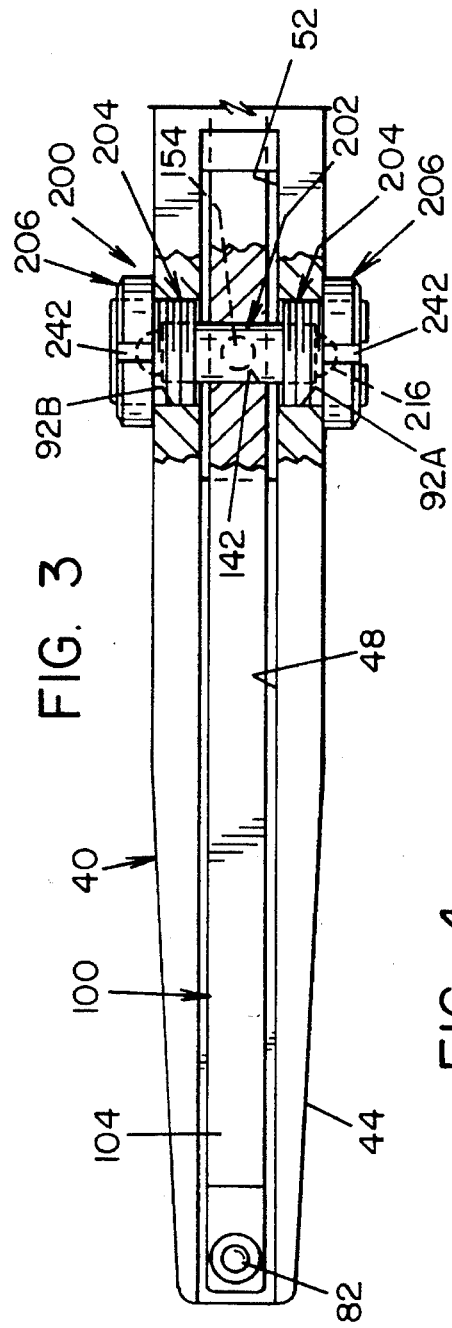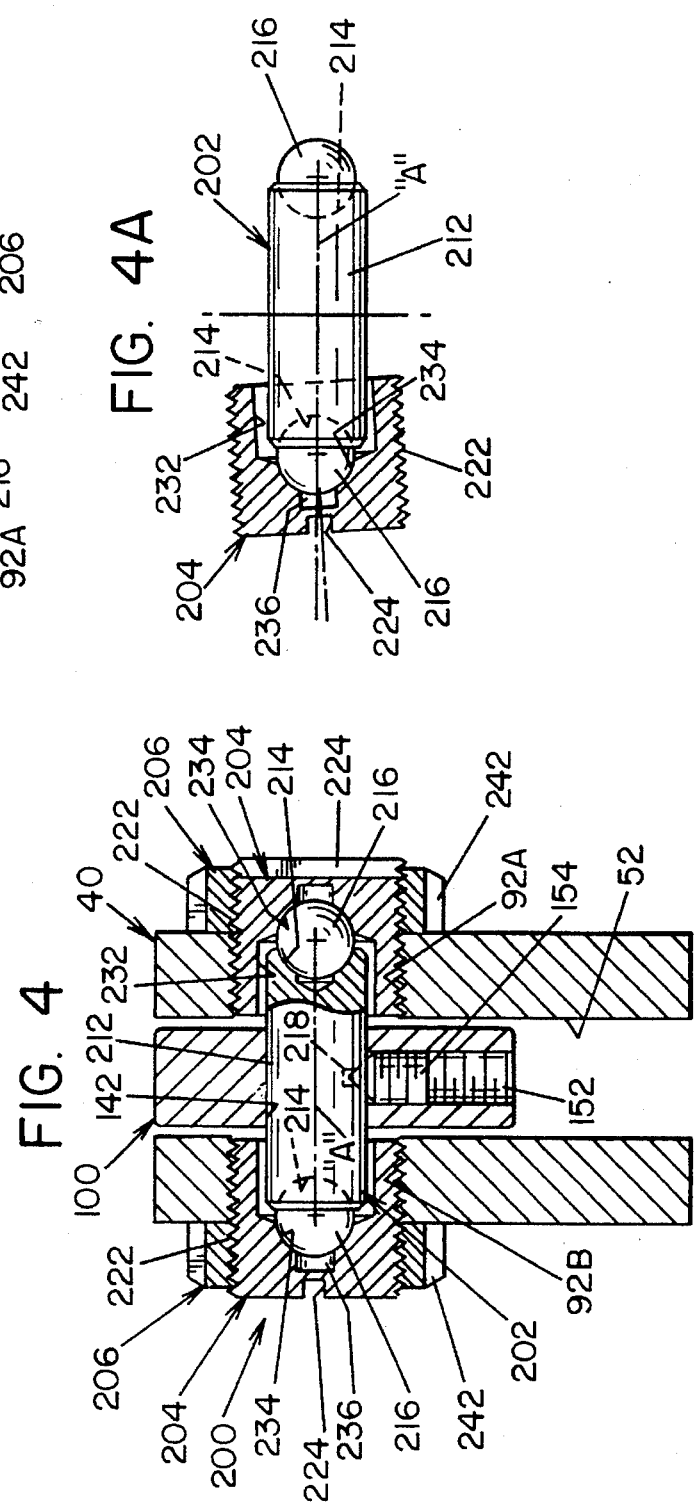

5,454,175

1
INTERNAL CALIPER

FIELD OF THE INVENTION

The present invention relates generally to measuring instruments, and more particularly to a high precision caliper for measuring interior dimensions.

BACKGROUND OF THE INVENTION

Precision caliper gauges have been known and widely used by craftsmen to measure inside diameters of screw threads, O-rings or snap ring grooves, undercut bores and the like. Examples of such devices are disclosed in U.S. Pat. No. 4,610,090 to Brady, U.S. Pat. No. 4,397,092 to Marcyan and U.S. Pat. No. 2,791,033 to Walters, each of which generally disclose calipers wherein parallel beams define the caliper arms. In such arrangements, one of the caliper beams is typically pinned to plates extending from the other beam to permit pivotal motion relative thereto. In other words, each of the foregoing designs basically discloses pivotally mounting one beam to an intermediate component which in turn is mounted to another beam. In addition, each includes a separate handle and trigger component attachable to a beam.

Because such measuring devices are intended to measure extremely small dimensions, their accuracy can be affected by their construction and design. In this respect, each additional attachment or component of a caliper must be precisely designed and manufactured to insure operating accuracy in the final caliper. As will be appreciated, the cost of fabricating a traditional component increases the overall cost, as well as assembly costs of such calipers.

The present invention provides a caliper wherein a first caliper arm is pivotally mounted directly to a second caliper arm in a scissor-like fashion, so as to reduce the number of components required therein, and provides a bearing assembly for mounting the first caliper arm to the second caliper arm that reduces the relative lateral deflection of the free ends of the caliper arms.

SUMMARY OF THE INVENTION

In accordance with the present invention there is provided a caliper gauge comprising an elongated body having a pistol-type grip formed at one end and a caliper arm formed at the other end. An elongated slot is formed in the body adjacent the pistol grip, and an opening through the body communicates with the slot. A lever having a trigger formed at one end and a caliper arm formed at the other end extends through the opening in the body with the trigger end of the lever disposed within the slot. The bearing assembly pivotally mounts the lever to the body. Means for biasing the trigger end of the lever away from the body are provided together with means for limiting separation of the trigger end of the lever from the body.

In accordance with another aspect of the present invention there is provided a caliper gauge comprising an elongated body having a pistol-type grip formed at one end, a caliper arm formed at the other end, and an opening through the body. A lever having a trigger formed at one end and a caliper arm formed at the other end extends through the opening in the body with said trigger end of the lever disposed adjacent the pistol-type grip. A bearing assembly pivotally mounts the lever to the body. The bearing assembly is comprised of a pair of bearing elements each having an axially aligned bore formed therein and a spherical bearing surface formed at the end of the bore. The bearing elements are mounted to the body wherein the bores are coaxially aligned and the bearing surfaces generally face each other. An elongated shaft having spherical ends dimensioned to matingly engage the spherical bearing surfaces of the bearing elements extends through the lever and is fixedly mounted thereto, with the spherical ends engaging the spherical bearing surface of bearing elements.

In accordance with another aspect of the present invention there is provided a caliper gauge for use with a dial indicator having a linearly movable actuator. The gauge is comprised an elongated body having a grip formed at one end and a caliper arm formed at the other end, and a lever having a trigger formed at one end and a caliper arm formed at the other. A bearing assembly pivotally mounts the lever to the body. The bearing assembly includes a pair of opposed bearing elements mounted to the body and a shaft mounted to the lever. The bearing elements have bearing surfaces engageable with bearing surfaces on the shaft. A clamp arrangement mounts the dial indicator to the body with the linearly movable actuator in engagement with the lever.

In accordance with another aspect of the present invention, there is provided a caliper gauge for use with a dial indicator having a linearly movable actuator. The gauge is comprised of an elongated body formed from a single block of metal, the body having a grip formed at one end, a caliper arm formed at the other and an opening therethrough, and a lever formed from a single metal plate, the lever having a trigger formed at one end and a caliper arm formed at the other. The lever extends through the opening in the body. A bearing assembly pivotally mounts the lever to the body. The bearing assembly includes a pair of bearing elements mounted to the body and a shaft mounted to the lever having spherical bearing elements at the end thereof engaging the bearing elements.

It is an object of the present invention to provide a precision instrument caliper gauge for measuring inside diameter of bores, pitch diameters of internal screw threads, pitch diameter of internal gears, and internal grooves.

Another object of the present invention is to provide a caliper gauge as described above having a unique design which minimizes side play at the ends of the caliper arms.

Another object of the present invention is to provide a caliper gauge as described above having a unique pivot pin design which compensates for slight relative misalignment of the pivot pin relative to the caliper arm.

A still further object of the present invention is to provide a caliper gauge as described above which utilizes a scissor-type design.

These and other objects and advantages will become apparent from the following description of the preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part thereof and wherein:

FIG. 3 is a sectional view taken along lines 3—3 of FIG. 2;

FIG. 4 is an enlarged sectional view taken along lines 4—4 of FIG. 2; and

FIG. 4A is a view of the mounting pin arrangement shown in FIG. 4 illustrating how such alignment can compensate for relative misalignment.

BRIEF DESCRIPTION OF PREFERRED EMBODIMENT

Figure 1:
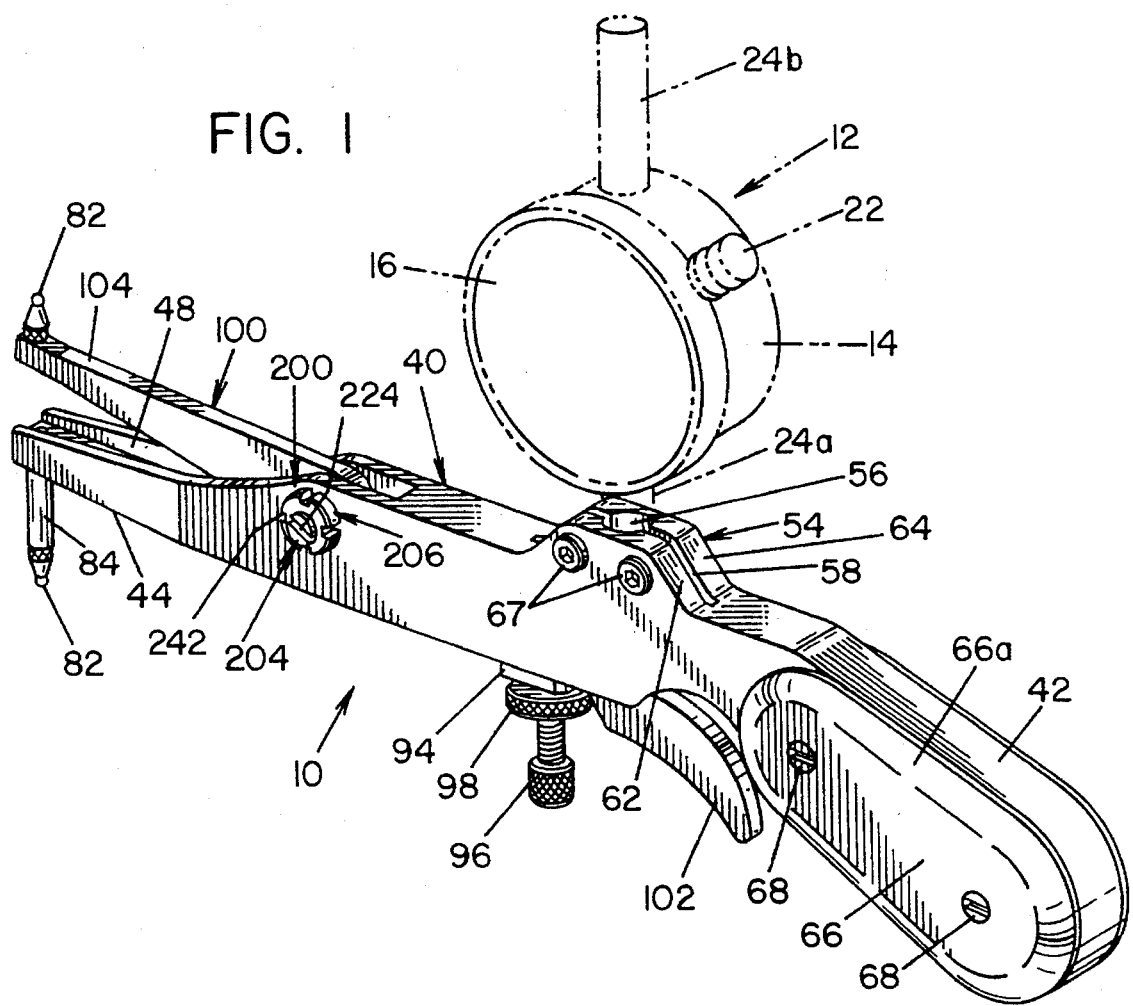
FIG. 1 is a perspective view of a caliper gauge illustrating a preferred embodiment of the present invention.

Referring now to the drawings, wherein the showing is for the purpose of illustrating a preferred embodiment of the invention only and not for the purpose of limiting same, FIG. 1 shows a caliper 10 illustrating a preferred embodiment of the present invention. Caliper 10 is adapted for use with a conventional dial indicator 12, showing phantom in FIG. 1. Dial indicator 12, in and of itself forms no part of the present invention, and therefore shall not be described in great detail.

Figure 2:
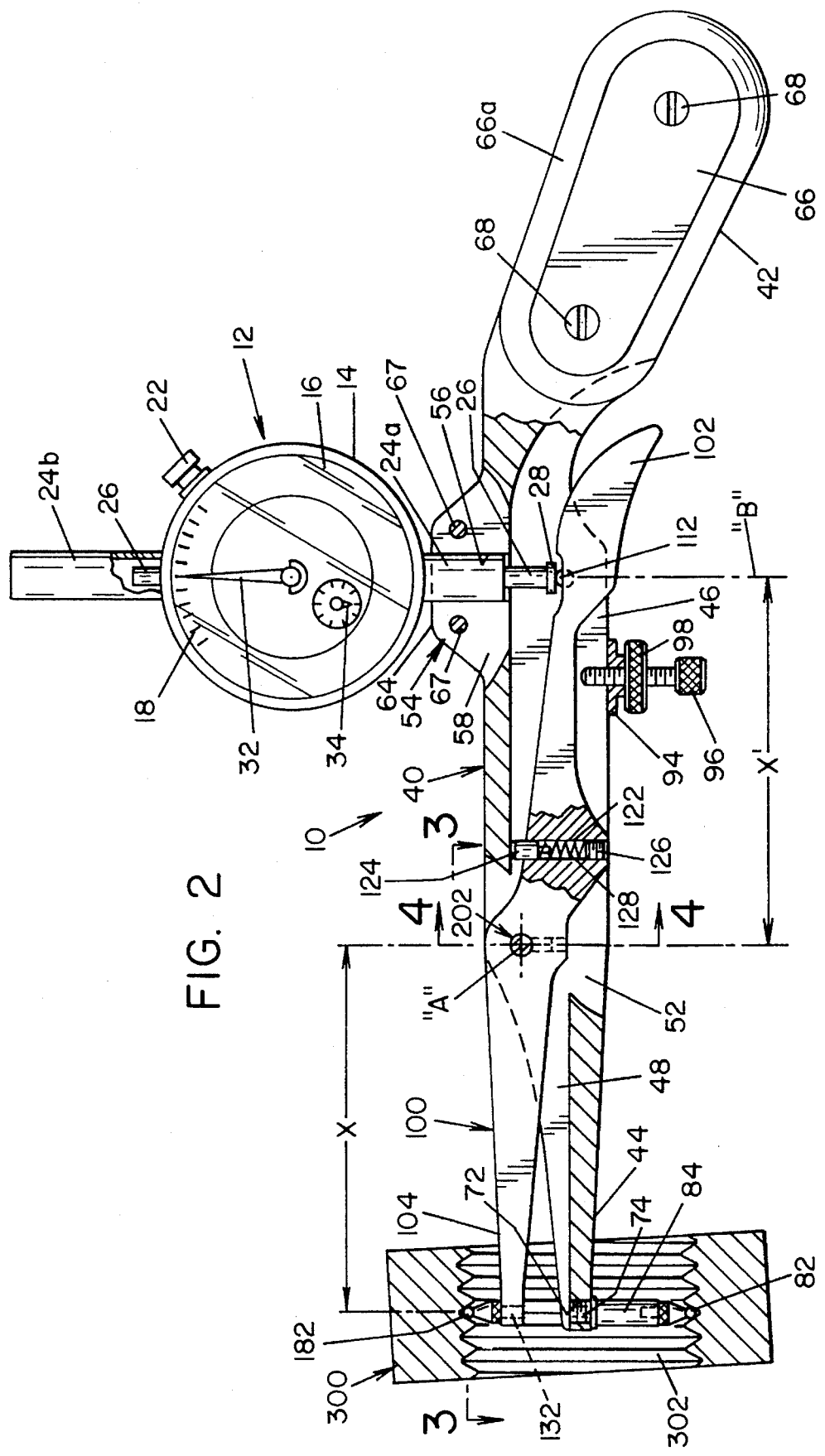
FIG. 2 is a partially sectioned, elevational view of the caliper gauge shown in FIG. 1 showing the gauge measuring the pitch diameter of an internal thread.

Indicator 12 basically includes a housing 14 and rotatable dial face 16 having measurement indications (i.e., a scale 18) thereon. A thumb screw 22 is provided to lock and position a rotatable dial face. A tubular sleeve 24a extends from the lower side of housing 14 and a cylindrical cap or cover 24b extends from the upper side of housing 14. A linearly movable stem or actuator 26 extends through sleeve 24a and housing 14, and into cover 24b, as best seen in FIG. 2. A flat contact element 28 is secured to the lower end of stem 26. Linear movement of stem 26 is translated into rotational movement of a primary indicator arm 32. In the embodiment shown, a second indicator arm 34 is provided to indicate the total number of revolutions of primary indicator arm 32.

Caliper 10 is generally comprised of a body 40, a lever 100 and a bearing assembly 200 that pivotally mounts lever 100 to body 40. According to the present invention, body 40 is preferably formed from a single block or bar of a lightweight, high strength metal such as titanium or an aluminum alloy. Aluminum has been found to be particularly suitable because of its light weight and easy machinability.

Body 40 is generally elongated and formed to have a grip-type handle portion 42 at one end, and a "needle nose" caliper arm 44 formed at the other end. In the embodiment shown, a downward opening slot 46 is formed in body 40 adjacent handle portion 42. An upward opening slot 48 is formed in caliper arm 44. Slots 46, 48 are centrally positioned and extend longitudinally through body 40. Slots 46, 48 communicate with each other to form an opening or passage 52 through body 40. Body 40 includes an indicator mounting boss 54 formed along the upper edge thereof, as best seen in FIG. 1. A centrally located bore 56 extends through mounting boss 54 and communicates with slot 46. Bore 56 is dimensioned to receive post 24 of dial indicator 12. A slot 58, which is generally aligned along the longitudinal axis of body 40 and communicates with bore 56, defines side-by-side wall portions 62, 64. A threaded aperture is provided through wall portions 62, 64 on each side of bore 56 to receive a conventional socket head fastener 67. As will be appreciated, wall portion 62, 64 and fasteners 67 form a clamp for securing dial indicator 12 within body 40, as shown in FIGS. 1 and 2.

Referring now to handle portion 42, in the embodiment shown, grip plates 66 having a chambered peripheral edge 66A are secured to handle portion 42 of body 40 by conventional fasteners 68, to provide a more contoured grip for holding by a user.

A threaded bore 72 is formed in the tip of caliper arm 44. A threaded insert 74, preferably formed of a hardened steel, is dimensioned to be received within bore 72. Insert 74 in turn includes an internal threaded bore which is dimensioned to receive a threaded portion of a contact point 82 or an extension 84 which in turn receives contact point 82, as shown in FIG. 2. Importantly, threaded bore 72 and caliper arm 44 are aligned with and parallel to bore 56 in mounting boss 54, such that contact point 82 and extension 84 when mounted to body 40 are parallel to the stem 26 of dial indicator 12.

Referring now to FIG. 4, opposed horizontal, cylindrical threaded bores 92A, 92B are formed through body 40. Bores 92A, 92B receive bearing assembly 200, as will be described in greater detail below. Importantly, the central axis bores 92A, 92B are disposed to be midway between the axis of contact point 82 and threaded bore 72 and caliper arm 44 and stem 26 of dial indicator 12. In other words, the distance between the center of bores 92A, 92B and the axis of contact point 82, which is designated "C" in the drawings is equal to the distance between the center of bores 92A, 92B and the axis of stem 26 of dial indicator 12.

As indicated above, body 40 is preferably formed from a single bar or plate of a lightweight, high strength metal. In this respect, the design of the present invention as shown in FIG. 1 and 2 lends itself to and may be easily manufactured by machining processes performed on a single integral bar or plate.

Referring now to FIG. 2, lever 100 is best seen. Lever 100 is generally an elongated, flat component having a trigger 102 formed at one end and a needle nose caliper arm 104 formed at the other. Lever 100 is dimensioned to extend through opening or passage 52 in body 40 with trigger 102 of lever 100 generally positioned within slot 46 and caliper arm 104 generally received within slot 48 of body 40. In this respect, trigger 102 is disposed below stem 26 of dial indicator 12. A spherical bearing 112 is secured to the upper edge of trigger 102 by epoxy or other suitable bonding material to engage contact element 28 of dial indicator 12. A bore 122 extends through lever 100. Bore 122 is dimensioned to receive a pin 124, and the lower end of bore 122 is threaded to receive a conventional set screw 126. A spring 128 is disposed between set screw 126 and pin 124. Bore 122 is positioned within lever 100 to act against body 40 to bias the trigger end of lever 100 away from body 40. A threaded bore 132 is formed at the extreme end of caliper arm 104 to receive a contact point 82 therein. Lever 100 is pivotally mounted to body 40 by bearing assembly 200. Importantly, according to the present invention, lever 100 is pivotally mounted to body 40 about an axis, designated "A" in FIG. 2, wherein the distance between axis A and axis "B" (designated X' in FIG. 2) is equal to the distance between axis A and the axis of threaded bore 132 (designated X in FIG. 2). Axis "B" is a line which is through the center of spherical bearing 112 and which is parallel to the axis of threaded bore 132. In this respect, it should be pointed out that because spherical bearing 112 is secured to lever 100, and is movable therewith, axis B (as defined above) may not be parallel to the axis of stem 26. Further, it should be noted that any relative movement of spherical bearing 112 on contact element 28 does not affect the reading of indicator 12.

Bearing assembly 200 is generally comprised of a bearing shaft 202, bearing housing sections 204, and bearing lock nuts 206. Bearing shaft 202 is comprised of a cylindrical pin 212 having spherical recesses 214 formed in the ends thereof. Recesses 214 are dimensioned to receive spherical bearings 216 which are secured to pin 212, preferably with epoxy. Pin 212 extends through a bore 142 formed in lever 100. A threaded bore 152 in lever 100 is dimensioned to receive a conventionally known cone-type set screw 154. Set screw 154 locks lever 100 to pin 212 by extending into a recess 218 formed in pin 212. Pin 212 is adapted to extend perpendicularly through lever 100.

Bearing housing sections 204 are generally cylindrical in shape and have an outer threaded surface 222 dimensioned to be matingly received by threaded bore 92A, 92B in body 40. An elongated slot 224 extends across the face of one end of housing section 204, to receive the end of a conventional flat head screwdriver to enable positioning of housing sections 204 within bore 92A, 92B or body 40. An axially aligned bore 232 is formed in the other end of housing sections 204. Bore 232 has a diameter greater than the diameter of cylindrical pin 212, as best seen in FIG. 4A. A spherical surface 234 is formed at the bottom (i.e., end) of bore 232. Spherical surface 234 is dimensioned to mate with and receive spherical bearings 216 on pin 212. A cylindrical counter bored cavity 236 is formed beyond spherical surface 234. Bearing assembly 200 is assembled by screwing bearing housing sections 204 into bores 92A, 92B of body 40 onto pin 212 until spherical surfaces 234 on housing sections 204 engage spherical bearing 216, as seen in FIG. 4.

Bearing lock nuts 206 lock and secure housing sections 204 in position on shaft 202. In this respect, bearing lock nuts 206 have internal threads matching the external threads on the outer surface 222 of housing sections 204. Bearing lock nuts 206 include opposed slots 242 for receiving driving pins on a spanner wrench used to secure lock nuts 206 onto body 40. FIG. 4A shows how bearing assembly 200 compensates for slight misalignment between shaft 202 and bearing housing sections 204. As best seen in FIG. 4, spherical bearing 216 engages spherical surface 234 generally beyond the outer surface of body 40. In this respect, the support distance, or distance between the bearing surfaces, is maximized, and the side play (or side movement) at the end of caliper arm 104 is minimized.

A bracket 94 is fastened to body 40 near trigger 102 of lever 100. Bracket 94 includes a threaded opening dimensioned to receive a knurled cap screw 96 which limits outward movement of lever arm 100. A knurled lock nut 98 is provided to lock cap screw 96 in position.

Referring now to the operation of gauge 10, FIG. 2 shows a component, designated 300 in the drawings, having internal threads 302 to be measured. In measuring internal dimensions, the proper set of contact points (according to the features to be measured) must be selected. For example, for measuring pitch diameter of internal screw threads, balled type contact points 82 as shown in the drawings are used. An extension 84 may be required depending upon the size of the internal dimension to be measured. After installing the appropriate extensions and contact points on caliper arms 44 and 104, a micrometer or gauge block is typically used to obtain the setting dimension. This dimension is set to the indicator by rotating the indicator dial until indicator arm 32 is aligned with the zero line on the dial face 16. In other words, the contact points 82 are set between the gauge block or micrometer and the dial face 16 of indicator 12 is rotated until zero is aligned with indicator arm 32. Cap screws 96 is set such that the resting position of lever arm 100 is slightly over the setting dimension, usually one half turn of indicator arm 32. This position can be locked in place by knurled lock nut 98. With trigger 102 limited in its outward swing by cap screws 96, the instrument is now ready for use by taking the internal measurement. In this respect, depressing trigger 102 towards body 40 narrows the spacing between caliper arms 44 and 104 and enables the contact points 82 to be positioned within the threads 302 to be measured. By releasing trigger 102, a measurement from the zero reading will be obtained by dial indicator 12.

The present invention thus provides a caliper gauge 10 which substantially reduces the number of components contained therein compared to caliper gauges known heretofore. In addition, the two major components (i.e., body 40 and lever 100) are integrally formed from single pieces of material using known computer assisted manufacturing techniques which provide for more accurate components.

In addition, bearing assembly 200 provides a mounting arrangement which improves the accuracy and reliability of the gauge 10 by compensating for slight misalignment between shaft 202 and bearing housing sections 204. In addition, the design of bearing assembly 200 minimizes the relative side play between caliper arms 44 and 104 by maximizing the supporting distance between bearing surfaces.

While the present invention has been described with respect to a preferred embodiment, modifications and alterations will occur to others upon a reading and understanding of the present specification. It is intended that all such modifications and alterations to the present invention be included insofar as the come within the scope of the patent as claimed or the equivalents thereof.

Thus having described the invention, the following is claimed:

1. A caliper gauge comprising:

an elongated body formed of a single piece of metal having a pistol-type grip formed at one end, a caliper arm formed at the other end, an elongated slot formed in said body adjacent said pistol-type grip, and an opening through said body communicating with said slot, a lever formed of a single piece of metal having a trigger formed at one end and a caliper arm formed at the other end, said lever extending through said opening in said body with said trigger end of said lever disposed within said slot, a bearing assembly for pivotally mounting said lever to said body, means for biasing said trigger end of said lever away from said pistol grip end of said body, and means for limiting separation of said trigger end of said lever and said pistol-grip end of said body.

2. A caliper gauge comprising:

an elongated body having a pistol-type grip formed at one end, a caliper arm formed at the other end, an elongated slot formed in said body adjacent said pistol-type grip, and an opening through said body communicating with said slot, a lever having a trigger formed at one end and a caliper arm formed at the other end, said lever extending through said opening in said body with said trigger end of said lever disposed within said slot, a pair of bearing elements each having an axially aligned bore formed therein and a spherical bearing surface formed at the end of said bore, said bearing elements being mountable to said body, said bores being coaxially aligned and said bearing surfaces generally facing each other, an elongated shaft having spherical ends dimensioned to matingly engage said spherical bearing surfaces of said bearing elements, said shaft extending through said lever and being fixedly mounted thereto, said spherical ends engaging said spherical bearing surface of bearing elements, means for biasing said trigger end of said lever away from said pistol grip end of said body, and means for limiting separation of said trigger end of said lever and said pistol-grip end of said body.

3. A caliper according to claim 2 wherein said bearing elements are reciprocally mounted to said body wherein the spacing between said bearing surfaces is adjustable.

4. A caliper according to claim 1 wherein said body includes a clamp assembly for receiving a dial indicator having a linearly movable actuator, said dial indicator positioned on said body wherein said actuator engages said lever.

5. A caliper gauge comprising:

an elongated body having a pistol-type grip formed at one end, a caliper arm formed at the other end, and an opening through said body, a lever having a trigger formed at one end and a caliper arm formed at the other end, said lever extending through said opening in said body with said trigger end of said lever disposed adjacent said pistol-type grip, a bearing assembly for pivotally mounting said lever to said body comprising:

a pair of bearing elements each having an axially aligned bore formed therein and a spherical bearing surface formed at the end of said bore, said bearing elements being mountable to said body, wherein said bores are coaxially aligned with said bearing surfaces generally facing each other, and an elongated shaft having spherical ends dimensioned to matingly engage said spherical bearing surfaces of said bearing elements, said shaft extending through said lever and being fixedly mounted thereto, said spherical ends engaging said spherical bearing surface of bearing elements.

6. A caliper according to claim 5, wherein said bearing elements are reciprocally mounted to said body wherein the spacing between said bearing surfaces is adjustable.

7. A caliper according to claim 5, wherein said shaft is comprised of a cylindrical pin having ball bearings attached to the ends thereof.

8. A caliper according to claim 5, wherein said bearing elements are cylindrical in shape and have a threaded outer surface dimensioned to be received in threaded bores in said body.

9. A caliper according to claim 8, wherein said bearing assembly further includes lock nuts for securing said bearing elements to said body.

10. A caliper according to claim 5, wherein said body is formed as a single metal component, and said lever is formed as a single metal component.

11. A caliper gauge for use with a dial indicator having a linearly movable actuator, said gauge comprised of:

an elongated body having a grip formed at one end and a caliper arm formed at the other end, a lever having a trigger formed at one end and a caliper arm formed at the other, a bearing assembly for pivotally mounting said lever to said body, said bearing assembly including a pair of opposed bearing elements mounted to said body and a shaft mounted to said lever, said bearing elements having bearing surfaces engageable with bearing surfaces on said shaft, and a clamp arrangement for mounting said dial indicator to said body with said linearly movable actuator in engagement with said lever.

12. A caliper according to claim 11, wherein said bearing surfaces of said bearing assembly are disposed outside said body.

13. A caliper according to claim 11, wherein said body is formed of a single block of metal.

14. A caliper according to claim 11 further comprising:

means for biasing said lever from said body, and means for limiting separation of said lever and said body.

15. A caliper gauge for use with a dial indicator having a linearly movable actuator, said gauge comprised of:

an elongated body formed from a single block of metal, said body having a grip formed at one end, a caliper arm formed at the other and an opening therethrough, a lever formed from a single metal plate, said lever having a trigger formed at one end and a caliper arm formed at the other, said lever extending through the opening in said body, a bearing assembly for pivotally mounting said lever to said body, said bearing assembly including a pair of bearing elements mounted to said body and a shaft mounted to said lever having spherical bearing elements at the end thereof engaging said bearing elements.

16. A caliper according to claim 15 further comprising a clamp arrangement for mounting said dial indicator to said body with said linearly movable actuator in engagement with said lever.

17. A caliper according to claim 15, wherein said bearing elements include spherical bearing surfaces dimensioned to receive said spherical bearing elements.

* * * * *